United States Patent [19]
Taylor et al.

[11] Patent Number: 6,016,646
[45] Date of Patent: Jan. 25, 2000

[54] ADJUSTABLE, RESILENT TWINE GUIDE FINGER FOR TWINE WRAP MECHANISM OF LARGE ROUND BALER

[75] Inventors: Mark Ronald Taylor; Roger William Frimml; Henry Dennis Anstey, all of Ottumwa, Iowa

[73] Assignee: Deere & Company, Moline, Ill.

[21] Appl. No.: 09/140,086

[22] Filed: Aug. 26, 1998

[51] Int. Cl.$^7$ .............................. B65B 13/02; A01F 15/07
[52] U.S. Cl. .................................... 56/341; 100/5; 100/88
[58] Field of Search ............................ 56/341, 342, 343, 56/DIG. 2; 100/5, 13, 77, 88, 89

[56] References Cited

U.S. PATENT DOCUMENTS

| | | |
|---|---|---|
| 4,169,410 | 10/1979 | Richardson . |
| 4,457,226 | 7/1984 | Meiers . |
| 4,627,340 | 12/1986 | Glass et al. . |
| 5,215,006 | 6/1993 | Jennings et al. . |
| 5,465,658 | 11/1995 | Wagstaff et al. . |
| 5,894,790 | 4/1999 | Viaud ........................................... 100/5 |

Primary Examiner—Robert E. Pezzuto

[57] ABSTRACT

A large round baler includes a twine wrap mechanism having twine arms which sweep horizontally between opposite side walls of the baling chamber at a location above the pickup and below the bale starter roll. Mounted to one of the baling chamber side walls is a twine guide finger for guiding the twine to the circumference of the bale such that wraps of twine are spaced from the adjacent end of the bale by a distance sufficient to keep the twine from being fed between the wall and the bale end or from slipping off the end of the bale during handling of the bale once discharged from the chamber. The guide finger, in one embodiment, comprises a spring wire member having a guide end portion that is joined to coils that are mounted about a support rod extending through the side wall of the baling chamber. In an alternate embodiment, the rod has a straight portion extending through the chamber side wall and joined to an inner end shaped to perform twine guidance, the outer end of the straight portion being connected to a coil spring that permits the rod to pivot about its straight portion so that the twine guidance portion of the rod will deflect rearwardly in response to crop being fed to the baling chamber. In both embodiments, the rod is adjustably fixed to the outside of the side wall by a manual adjustment permitting the support rod to be moved in and out among an infinite number of positions within a range of adjustment so as to change the spacing of the twine guide fingers relative to the side wall so as to accommodate bales having surfaces of varying slickness due to different crops and/or crop conditions.

28 Claims, 3 Drawing Sheets

1

ADJUSTABLE, RESILIENT TWINE GUIDE FINGER FOR TWINE WRAP MECHANISM OF LARGE ROUND BALER

BACKGROUND OF THE INVENTION

The present invention relates mechanisms for wrapping twine about large round bales in the baling chamber of a large round baler, and more particularly, relates to twine guide fingers for such mechanisms.

Typically, twine wrapping mechanisms of a large round baler include one or more twine arms which are mounted to travel or swing between the opposite side walls of the baling chamber, with each twine arm including a twine tube at its outer end through which twine is pulled into the baling chamber by the rotating bale, thus, wrapping twine upon the circumference of the bale. It is known to provide twine guide fingers spaced a desired distance inwardly from opposite side walls of the baling chamber in order to intercept and cause multiple wraps of twine to be placed about the bale at locations adjacent opposite ends of the bale. U.S. Pat. No. 4,457,226 issued to Meiers on Jul. 3, 1984 discloses such twine fingers. These fingers are not entirely satisfactory however since they are fixed in a zone where they can interfere with the flow of crop into the baling chamber. Also, during service, the fingers can become entangled in slack bale forming belts, causing damage or breakage to the guide and/or belts.

It has been found that the end wraps of twine may have a tendency to slip off the ends of bales made from some crops, like slick dry straw for example. In order to accommodate these crop conditions, it is known to mount the fingers for a small range of adjustment, about four inches, for example. However, some of these adjustable guide fingers are not entirely satisfactory since only incremental adjustments can be made and adjustment requires a pin, or the like to be removed and then reinserted at the new setting, thus, opening the opportunity for the pin to be lost or misplaced. Other guide fingers, for example, those disclosed in U.S. Pat. No. 5,215,006, granted to Jennings et al. on Jun. 1, 1993, are adjustable to an infinite number of positions within a range of adjustment, but are not readily accessible for adjustment since they are located next to the baling chamber inlet between the baling chamber side walls.

SUMMARY OF THE INVENTION

According to the present invention, there is provided an improved twine guide finger for use in wrapping large round bales.

A broad object of the invention is to provide a twine guide finger which, although located within a zone which is occupied by a stream of crop during baling operation, only minimally inhibits the flow of crop into the baling chamber.

A more specific object of the invention is to provide a twine guide finger, as set forth in the previous object, wherein the finger is constructed of resilient yieldable material so that the finger deflects out of the way when engaged by crop being conveyed to the baling chamber.

Another object of the invention is to provide a finger constructed so as to permit it to be mounted close to the entrance to the baling chamber where it will not interfere with the bale-forming belts when the latter are loosened during servicing or bale ejection.

A further object of the invention is to provide a twine guide finger assembly which may be adjusted so as to change the spacing between the guide finger and the baling chamber side wall without necessitating that parts be disassembled thereby avoiding lost parts.

Yet a more specific object is to provide a guide finger which is manually adjustable, without the need of tools, from a location outside the side wall of the baling chamber.

These and other objects will become apparent from a reading of the ensuing description together with the appended drawings.

DESCRIPTION OF THE PREFERRED EMBODIMENT

Figure 1:
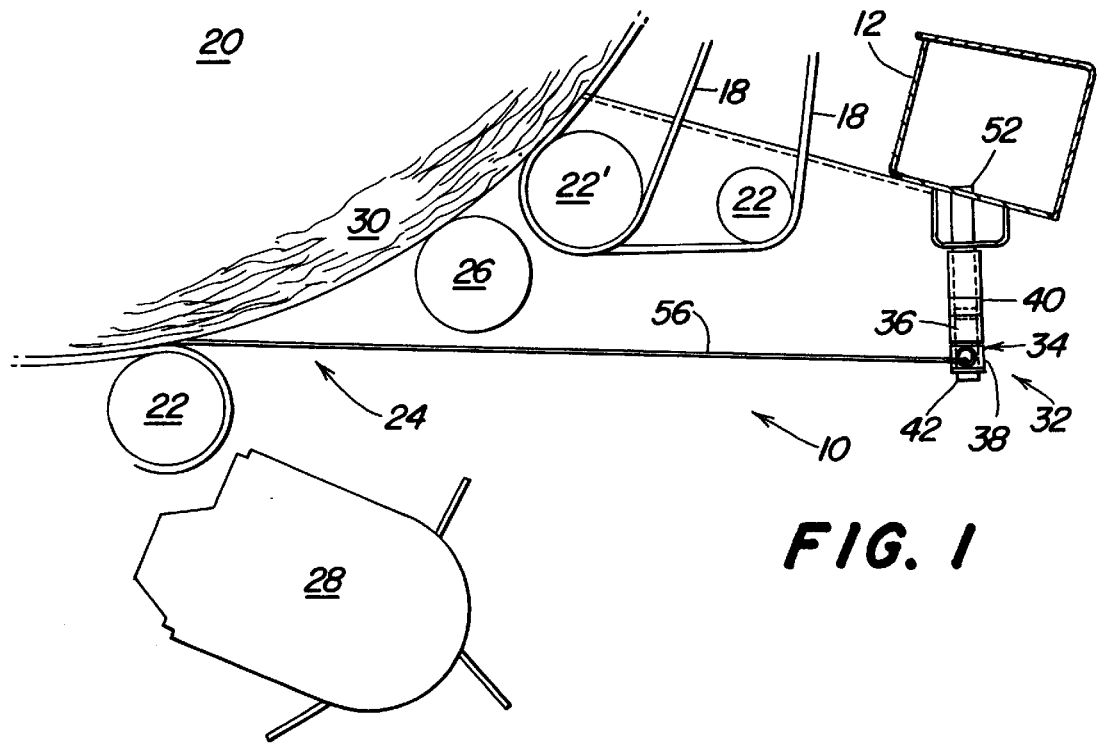
FIG. 1 is a somewhat schematic right side elevational view of the crop inlet portion of a large round baler equipped with a twine wrapping assembly, with baler side walls, twine arm drive mechanism and twine guide being excluded for clarity.
Figure 2:
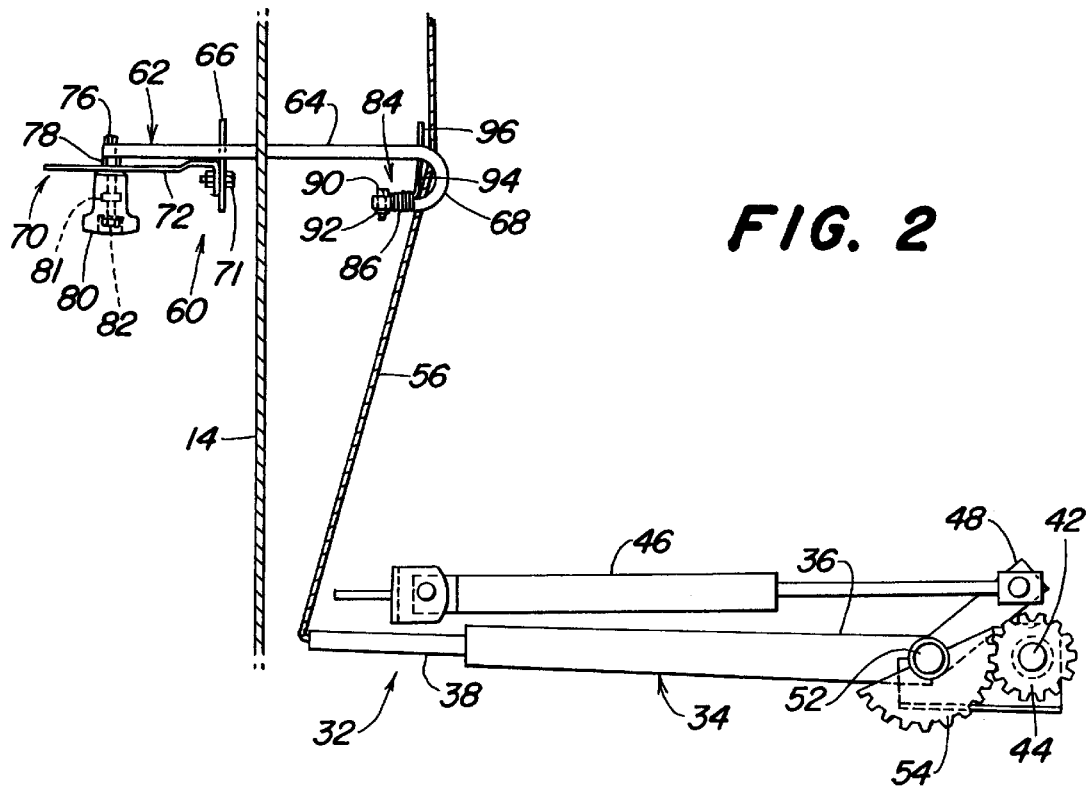
FIG. 2 is a top plan view of the twine wrapping assembly.
Figure 3:
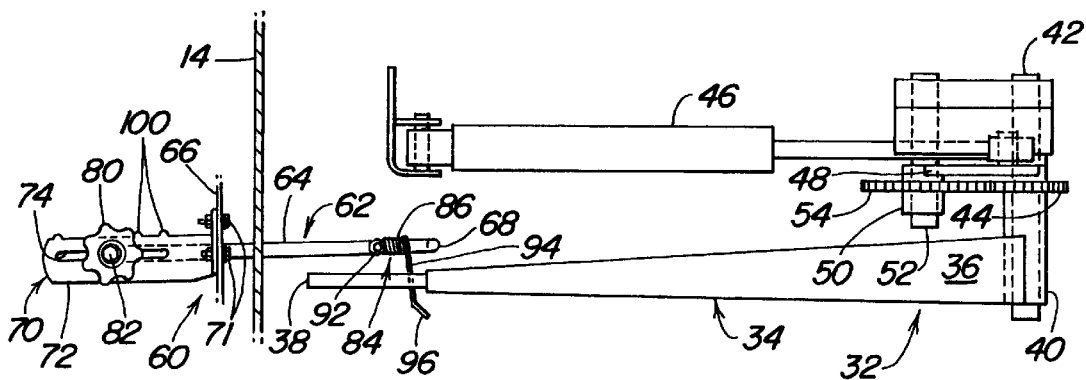
FIG. 3 is a front elevational view of the twine wrapping assembly.

Referring now to FIGS. 1–3, there is shown a portion of a large round baler 10 including a main frame 12 comprising right- and left-hand side walls of which only the right-hand side wall 14 is shown (FIGS. 2 and 3). The side walls cooperate with a plurality of bale-forming belts 18 to define a baling chamber 20, the belts 18 being supported in side-by-side relationship on a plurality of belt-support rolls 22, one of which is a belt drive roll 22'. A crop inlet 24 is defined between the drive roll 22' and one of the rolls 22 at a lower front location of the baling chamber, and located within the inlet 24, adjacent the drive roll 22' is a bale starter roll 26. A pickup assembly 28 is provided for elevating a windrow of crop from the ground and conveying it though the inlet 24 so as to be rolled into a bale 30 by the action of the baling belts 18.

Provided for wrapping the bale 30 with twine when the bale has reached a desired size within the baling chamber 20 is a twine wrapping mechanism 32. It is to be noted that the twine wrapping mechanism shown here is merely representative of the various types of wrapping mechanisms with which the present invention would find utility. Specifically, the twine mechanism 32 includes a twine arm 34 constructed of a tapering channel member 36 having twine delivery tube 38 at its outer end. The twine arm 34 has an inner end defined by an upright pivot tube 40 that is mounted for pivoting about an upright axis defined by a pivot pin 42 fixed to the baler frame 12 at a location approximately half way between opposite sides of the baler. A drive gear 44 (FIGS. 2 and 3) is fixed to the tube 40. An extensible and retractable actuator 46 is coupled between a crank arm 48 fixed to a tube 50 that is mounted for pivoting about a pivot pin 52 mounted to the frame 12 in closely spaced parallel relationship to the pivot pin 42. A pinion gear 54 is mounted to the tube 50 and is meshed with the gear 44 such that extension and retraction of the cylinder 46 will cause the twine arm 34 to be swung back and forth between the opposite side walls of the baling chamber 20. A roll of twine (not shown) is the source of twine used and a length of twine 56, that is joined to the roll, is shown threaded through a twine tensioner (not shown) mounted to the twine arm channel member 36 and through the twine delivery tube 38.

Figure 4:
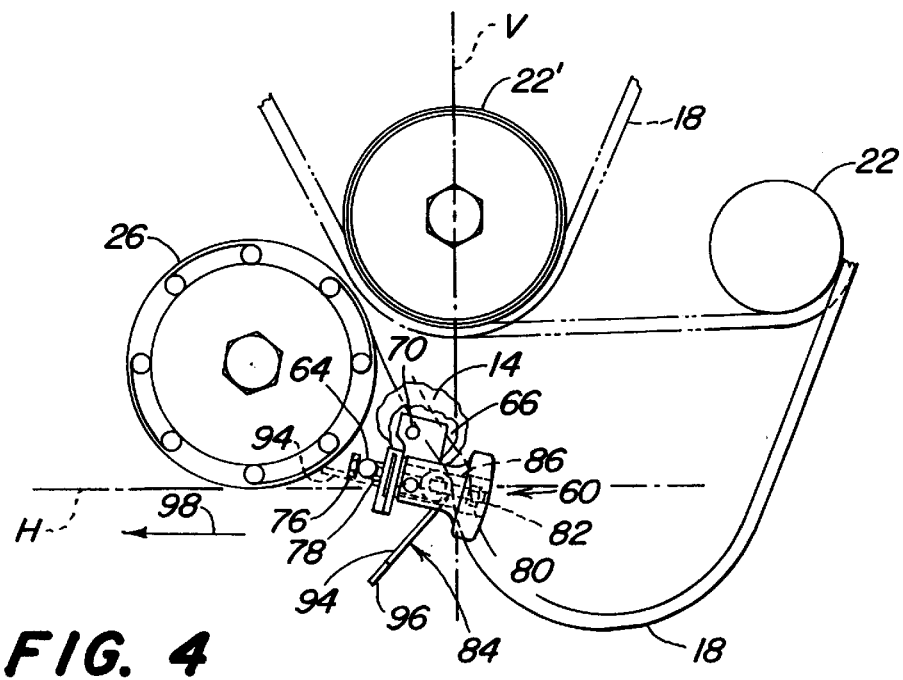
FIG. 4 is an enlarged right side elevational view showing the position of the twine guide relative to the flow of crop being conveyed to the baler inlet and relative to a baler belt, shown in broken lines in a normal operating position and in solid lines in a loose service position, with the twine guide finger being shown in solid lines in its normal operating position and being shown in dashed lines in its fully deflected position.

A twine guide assembly 60 is mounted to the right-hand side wall 14 (FIGS. 2 and 3). It is to be noted that a similar twine guide assembly could be mounted to the left-hand wall as well. Referring now also to FIG. 4, it can be seen that the twine guide assembly 60 includes a finger support rod 62 having a straight section 64 extending through axially aligned holes provided in the side wall 14 and in a wall 66 forming part of a drive shaft bearing bracket that is bolted to an outer surface of the side wall 14. The inner end of the rod straight section 64 is joined to a back-turned section 68. The finger support rod 62 is held in place by an L-shaped support bracket 70 having a short leg secured, as by bolts 71, to the bearing bracket wall 66 and having a long leg 72 disposed in parallel relationship to the rod section 64 and containing an adjustment slot 74. A knob mounting bolt 76 extends through a hole provided adjacent the end of the rod section 64 and is secured to the rod section by a nut 78 located between the rod section and the support bracket leg 72. The bolt 76 extends beyond the nut 78 and through the adjustment slot 74. Received on the bolt 76 for clamping the bolt to the bracket leg 72 is a knob 80 preferably made of plastic and having a threaded metal insert 81 (FIG. 2) molded therein which is threaded onto the bolt 76. A safety lock nut 82 is received on the outer end of the bolt with enough clearance being present between the lock nut 82 and the knob 80 so as to not interfere with the loosening of the knob when adjustment of the rod 62 is desired, for a purpose explained below.

A twine guide finger 84, formed from spring wire or rod, includes a plurality of coils 86 received on the back-turned section 68 of the finger support rod 62 and, at an end toward the side wall 14, terminates in a loop having a mounting bolt 90 received therein and through a hole provided adjacent a free end of the rod section 66, the bolt 90 receiving a nut 92 holding the guide finger 84 in place. At an inner end of the coils 86 remote from the loop, there is a finger section 94 that extends downwardly and rearwardly and has a lower outwardly bent end 96 (FIG. 4) located approximately beneath an area where the support rod straight and back-turned sections 64 and 68, respectively, join each other.

As can best be seen in FIG. 4, the twine finger assembly 60 is located so that the back-turned rod section 68 is located approximately at the intersection of a vertical line V, passing through the center of the belt drive roller 22, and a horizontal line H tangent to the bottom of the starter roll 26. The finger assembly is thus located just forwardly of a lower portion of the bale starter roll 26. In this position the twine guide finger section 94 extends downwardly and rearwardly into a crop flow zone 98 through which crop travels as it is conveyed into the bale chamber inlet 24. It is noted that the coils 86 are wound such that the finger section 94 will tend to be resiliently deflected upwardly so as to tighten the coils when engaged by crop. However, although the finger section 94 is quite flexible from front to back, it exhibits considerable side-to-side stiffness because the inside diameter of the coils 86 is only slightly larger than the outside diameter of the support rod 62. The maximum amount that the finger section 94 will deflect is shown in dashed lines, the finger section 94 then terminating in closely spaced relationship to the starter roll 26 and engaging the support rod 62 which prevents further upward deflection. It will be evident that a resilient plastic material could be used in lieu of the coiled spring twine guide finger 84, with the plastic finger having a general shape like the finger section 94 but having a cross section which results in considerable fore-and-aft flexibility, but side-to-side rigidity.

Due to the guide finger 62 being mounted in a location close to the starter roll 26, and, hence to the baling chamber inlet 24, there is little chance that any contact will be made with the guide finger 62 by any loose belt 18 during servicing. This positioning of the twine guide assembly 60 is made possible since the finger section 94 only minimally interferes with crop flow.

Adjustment of the twine finger support rod 62 changes the distance that the twine guide finger section 94 is spaced from the side wall 14. Specifically, by loosening the knob 80, the bolt 76 may be slid inwardly or outwardly in the slot 74 to adjust the rod 62, respectively, between an outermost position, determined by the inner end of the slot 74, and an innermost position, determined by the outer end of the slot 74. As can best be seen in FIG. 3, protuberances 100 are spaced evenly along the top edge of the bracket leg 72 to give the operator a visual indication of the adjusted position of the twine guide finger section 94. Typically, the twine guide finger section 94 would be about 4" from the side wall 14 when the finger support rod 62 is in its outermost location in the slot 74 and would be about 8" from the side wall 14 when the support rod 62 is at its innermost location in the slot 74. The reason for adjusting the position of the finger section 94 relative to the wall is to accommodate different crops or crop conditions which result in the outer surface of the formed bales being of different degrees of slickness. The slicker the outer surface of the formed bale 30 is the more apt loops of twine are to slip off the end of the bale during wrapping or when the bale is handled after being discharged from the baler. Accordingly, the twine guide finger section 94 will be located at about 4" from the wall 14 when the bale surface is has a lot of coarse crop stems tending to hold the twines in place and will be located about 8" from the wall 14 when the bale surface is relatively smooth and slick, as may be the case when baling relatively dry, short straw, for example. When the formed bale has a surface between these extremes, a corresponding desired location between the 4" and 8" extremes is selected. While the twine finger support rod 62 is here shown as being manually adjustable, it should be noted that, in lieu of the bracket 70 and knob 80, an electrically or hydraulically powered actuator could be connected to the rod 62 for selectively reciprocating it among desired positions of adjustment.

Figure 5:
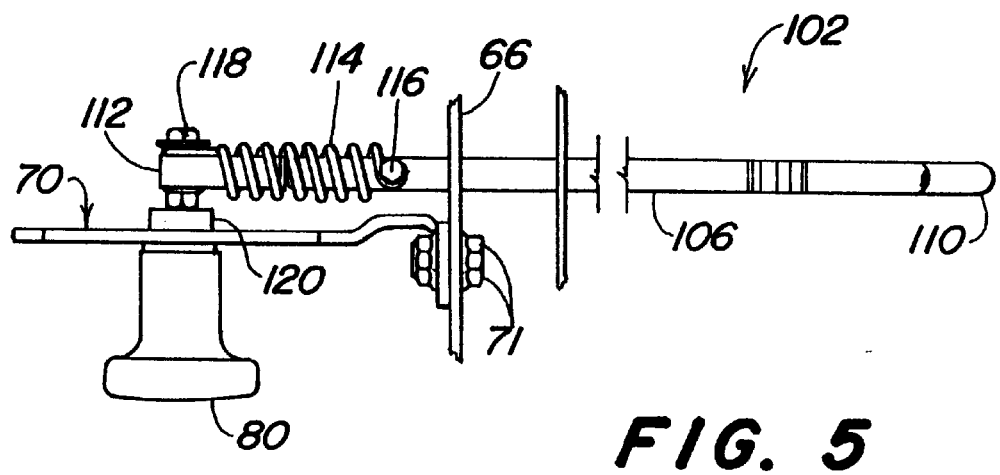
FIG. 5 is a top plan view of an alternate embodiment of the twine finger.
Figure 6:
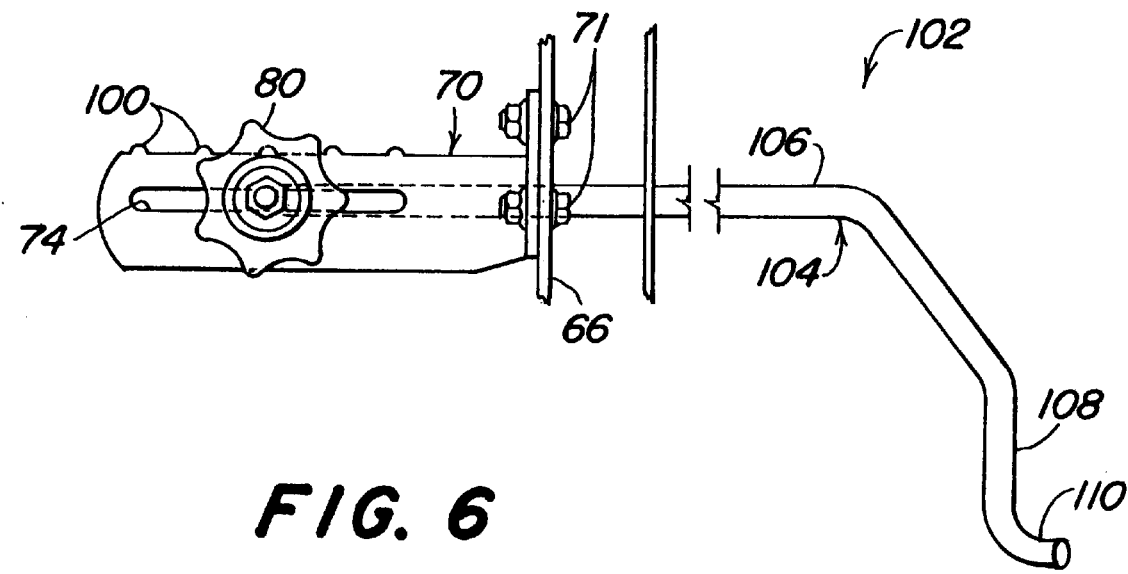
FIG. 6 is a front elevational view of the twine finger shown in FIG. 5.

Referring now to FIGS. 5 and 6, there is shown a twine guide assembly 102 which may be used in lieu of the twine guide assembly 60, it being noted that some of the parts of the guide assembly 102 are the same as, and are identified with the same reference numerals as are, parts of the assembly 60. Specifically, the twine guide assembly 102 includes a generally L-shaped twine finger 104 in the form of a rod including a horizontal transverse outer support section 106, and an integral, downwardly extending, inner twine-engaging section 108 having an inwardly extending end portion 110 for retaining the length of twine 56. The twine finger 104 is mounted to the adjustment bracket 70 for transverse adjustment by an assembly including a mounting rod 112, disposed in axial alignment with the outer rod section 106, and a soft helically coiled spring 114 into the opposite ends of which project, and at approximately the middle of which meet, the rod section 106 and mounting rod 112. The spring 114 has loops formed at its opposite ends with the loop at its inner end being anchored to the rod section 106 by a bolt 116 and with the loop at its outer end being anchored to the mounting rod 112 by a knob mounting bolt 118. The mounting bolt 118 extends through and is clamped to the mounting rod 112 by the nut 78, while the bolt 118 extends through the adjustment slot 74 and is clamped to the adjustment bracket leg 72 by the knob 80 and a spacer 120 located on the bolt 118 between the nut 78 and the bracket leg 72. Thus, it will be appreciated that crop passing through the crop flow zone 98 and into the baling chamber 20 will engage the inner twine-engaging finger section 108 causing it to be swung upwardly and rearwardly against the resistance of the spring 114.

The operation of the twine guide finger assemblies 60 and 102 are thought to be clear from the foregoing description and for the sake of brevity is not repeated here. Suffice it to say that due to the location of the adjustment knob 80 outside the side wall 14, easy access is provided for loosening the knob 80, without tools or disassembly, when it is desired to change the spacing between the twine guide finger section 94 or 108 and the side wall 14 for ensuring that loops of the twine 56, that are applied adjacent the ends of the bale 30, will be spaced far enough from the end to remain secure despite changes in crop or crop conditions which results in variations in the slickness of the outer surface of the formed bale 30; and that the finger section 94 or 108 will easily deflect in the fore-and-aft direction in response to being contacted by a stream of crop so as not to significantly interfere with crop flow but exhibits considerable side-to-side stiffness such as to operate in a correct manner to guide the length of twine 56 onto the bale 30.

We claim:

1. In a large round baler including a baling chamber having opposite side walls, a crop pickup for moving a stream of crop along a fore-and-aft extending path into said baling chamber, and a twine wrap mechanism including at least one twine dispensing apparatus mounted for moving back and forth across at least a portion of a distance between said opposite side walls and also including a twine guide assembly mounted to at least one of said opposite side walls, the improvement comprising: said twine guide assembly including a twine guide finger; and mounting means supporting said twine guide finger for resiliently deflecting in a fore-and-aft direction in response to being engaged by said stream of crop.

2. The large round baler defined in claim 1 wherein said mounting means permits only limited side-to-side deflection of said twine guide finger as compared to fore-and-aft deflection.

3. The large round baler defined in claim 1 and further including a stop for limiting fore-and-aft deflection of said twine guide finger.

4. The large round baler defined in claim 1 wherein said twine guide assembly includes a finger support member mounted to said at least one of said opposite side walls and extending into a zone adjacent said path and baling chamber; and said mounting means attaching said twine guide finger to said finger support member.

5. The large round baler defined in claim 1 wherein said twine guide finger is constructed of a resilient material.

6. The large round baler defined in claim 5 wherein said twine guide finger is made of spring wire having a transversely extending coiled section; and said means mounting including a fastener securing said coiled section to said finger support member.

7. The large round baler defined in claim 6 wherein said finger support member extends within said coiled section of said twine guide finger and acts as part of said mounting means which limits side-to-side deflection of said guide finger.

8. The large round baler defined in claim 7 wherein said finger support member has a back-turned portion located forwardly of a remainder of said finger support member; and said coiled section of said twine guide finger being received on said back-turned portion with said guide finger having a free end located for being deflected in a direction corresponding to a direction of wrap of said coiled section; and said remainder of said finger support member being located so as to act as a stop limiting deflection of said guide finger free end.

9. The large round baler defined in claim 1 wherein said twine guide finger is formed as a part of a rod having a straight portion extending transversely through said one of said opposite side walls; and said mounting means including a spring means coupled to said straight portion and resiliently resisting pivoting of said straight portion of said rod about an axis extending centrally along said straight portion, whereby said twine guide finger will be caused to swing upwardly and rearwardly in response to being contacted by said stream of crop.

10. The large round baler defined in claim 1 wherein said resilient means comprises a helically coiled spring received over an outer end portion of said rod and a first end anchored to said rod and a second end fixed to said at least one of said opposite side walls.

11. The large round baler defined in claim 1 wherein said twine guide assembly further includes adjustable securing means for fixing said twine guide finger to said at least one of said opposite side walls for placement in one of an infinite number of adjusted positions, differing in spacing from said at least one of said opposite side walls, within a range of adjustment.

12. The large round baler defined in claim 11 wherein said twine guide assembly includes a rod extending through said at least one of said opposite side walls; and said adjustable securing means being located entirely on an opposite side of said at least one of said opposite side walls from said guide finger.

13. The large round baler defined in claim 12 wherein said adjustable securing means includes a bracket portion extending parallel to said rod and containing an adjustment slot paralleling said rod; a bolt extending through said rod and through said slot; and a clamping element threaded onto said bolt for holding the latter in an adjusted position along said adjustment slot.

14. The large round baler defined in claim 13 wherein said clamping element is in the form of a manually releasable knob.

15. In a large round baler including a baling chamber having opposite side walls, and a twine wrap mechanism including at least one twine dispensing apparatus mounted for moving back and forth across at least a portion of a distance from one towards another of said opposite side walls, and a twine guide mounted to at least one of said opposite side walls and including a guide finger across which twine travels when twine is being wrapped upon a circumference of a bale located in said baling chamber, the improvement comprising: said twine guide including a rod extending through said one side wall; and adjustable securing means for selectively fixing said rod in place in one of an infinite number of positions within a range of adjustment.

16. The large round baler defined in claim 15 wherein said securing means includes a mounting bracket having a portion extending parallel to said rod and fixed to an exterior location of said one side wall; said bracket portion containing an adjusting slot extending parallel to said rod; and a bolt extending through said rod and into said slot and having a manually releasable retaining knob threaded onto the bolt for holding the rod in a selected position.

17. The large round baler defined in claim 16 wherein said mounting bracket portion has a plurality of evenly spaced protrusions located along one side thereof in parallel relationship to said adjusting slot, thereby giving an operator a visual indication of the adjusted position of said rod.

18. The large round baler defined in claim 17 wherein said twine guide includes a resilient guide finger mounted to said rod.

19. The large round baler defined in claim 18 wherein said resilient guide finger is constructed of a spring metal rod having a coiled section received on and attached to said rod.

20. The large round baler defined in claim 19 wherein said rod has a back-turned inner end on which said coiled section is received; and said spring metal rod having an end located for being deflected against said rod, which thus acts as a stop.

21. In a large round baler including a baling chamber defined in part by a pair of transversely spaced side walls and by a plurality of belt support rolls extending between and supported by said side walls, and, in turn, supporting a plurality of side-by-side arranged bale-forming belts, with a lower front location of said baling chamber including a crop inlet defined between first and second ones of said support rolls, with said first one of said support rolls being a drive roll located upwardly and forwardly from said second one of said support rolls, a bale starter roll being located in said crop inlet adjacent said drive roll and above a crop flow path extending into said crop inlet, a twine guide assembly mounted to at least one of said side walls and including a twine guide finger extending downwardly into said crop flow path, and a twine dispensing mechanism including at least one twine dispensing arm mounted for movement to-and-fro between said side walls at a level commensurate with said twine guide finger, the improvement comprising: said twine guide assembly including guide finger mounting means supporting said twine finger for being deflected upwardly by crop flowing to said crop inlet along said crop flow path.

22. The round baler defined in claim 21 wherein said twine guide assembly is located such that an upper part of said twine finger is located approximately at the intersection of a vertical line extending through center of said drive roller and a horizontal line tangent to said starter roll, whereby said finger is located rearwardly of a location occupied by said bale-forming belts when the latter are in a loose, service or bale ejection condition looped down below said drive roll and said finger.

23. The round baler defined in claim 22 wherein said twine guide assembly is located such that a fully deflected position of said guide finger places it close to a lower front location of said starter roll.

24. The round baler defined in claim 21 wherein said guide finger mounting means includes means supporting said guide finger for relatively free fore-and-aft deflection and limited side-to-side-deflection.

25. The round baler defined in claim 24 wherein said guide finger mounting means includes a transversely extending guide finger support member; said guide finger including a coiled section received on and secured to said support member, and a finger section joined to said coiled section with the coiled section being disposed such that said finger moves in a direction tending to form an additional coil when it is deflected rearwardly.

26. The round baler defined in claim 25 wherein said finger mounting means supporting said guide finger includes said support member which is sized relative to said coiled section of said finger that side-to-side deflection of said finger is limited by an inside of said coiled section coming into contact with an outside surface of said support member.

27. The round baler defined in claim 25 wherein said support member is elongate and forms part of said guide finger mounting means; said support member having an inner end shaped to define said guide finger and having a straight portion joined to said guide finger and extending transversely through said at least one of said opposite side walls; said guide finger mounting means further including a helically coiled spring received on and having a first end anchored to an outer end portion of said support member; and said coiled spring having a second end anchored to said at least one of said at least one of said opposite side walls.

28. The round baler defined in claim 21 wherein said guide finger has an inwardly bent end section which prevents twine from slipping off the guide finger.

* * * * *